United States Patent [19]

Miyanaga

[11] 4,297,059

[45] Oct. 27, 1981

[54] APPARATUS FOR FORMING HOLES IN PLATE GLASS

[76] Inventor: Masaaki Miyanaga, 5-15-109 Matsuhamacho, Ashiya, Hyogo, Japan

[21] Appl. No.: 64,133

[22] Filed: Aug. 6, 1979

Related U.S. Application Data

[62] Division of Ser. No. 919,407, Jun. 26, 1978, Pat. No. 4,209,272.

[51] Int. Cl.³ .............................................. B23B 51/04
[52] U.S. Cl. ..................................... 408/202; 125/20; 408/204; 408/225
[58] Field of Search ................. 408/68, 202, 204, 205, 408/703, 56, 16, 118, 224, 225; 125/20

[56] References Cited

U.S. PATENT DOCUMENTS

| | | | |
|---|---|---|---|
| 58,924 | 10/1866 | Webster | 408/204 X |
| 308,842 | 12/1884 | Hunt | 408/68 X |
| 484,075 | 10/1892 | Wilkie | 125/20 |
| 1,705,049 | 3/1929 | Fournier | 408/68 |
| 2,454,522 | 11/1948 | Palmer | 408/204 |
| 3,794,438 | 2/1974 | Knutsson | 408/224 X |

FOREIGN PATENT DOCUMENTS 2122119  5/1972  Fed. Rep. of Germany ...... 408/118

Primary Examiner—Z. R. Bilinsky
Attorney, Agent, or Firm—Merriam, Marshall & Bicknell

[57] ABSTRACT

This disclosure relates to apparatus and method of forming circular holes in plate glass. A circular cut is made in the glass to a predetermined depth, which is less than the thickness of the glass by approximately 0.5 to 1.0 mm. After this cut has been made, the cutting apparatus is removed and the glass is softly struck adjacent to the circular cut in order to break loose the glass disc enclosed by the cut. The edge or margin of the hole may then be smoothed by grinding or polishing. The glass cutting apparatus includes a circular saw or glass cutter which is rotated to cut the glass. A stopper of the apparatus is adjustably mounted adjacent the cutting edge of the saw and stops the saw from cutting further after a predetermined depth has been reached. The position of the stopper may be adjusted for different thicknesses of glass.

1 Claim, 6 Drawing Figures

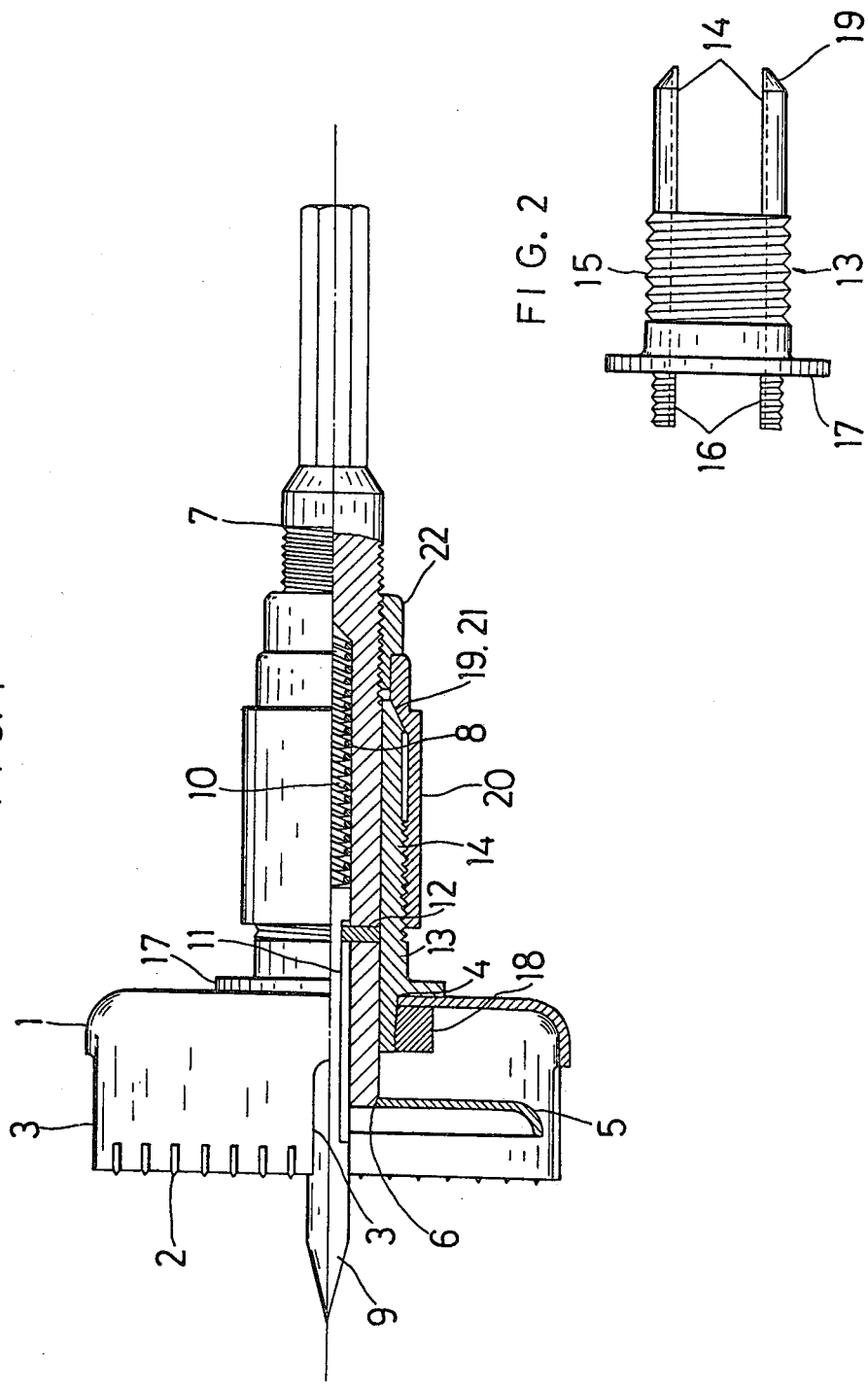

FIG. 5
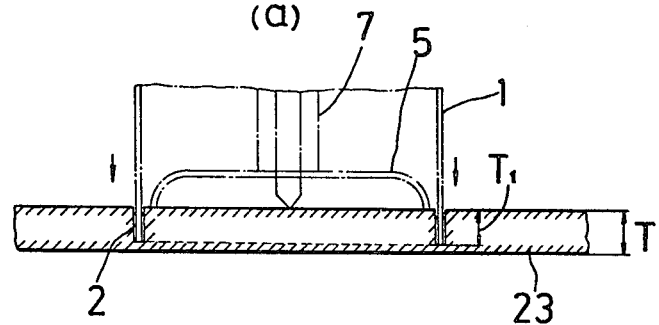
(a)
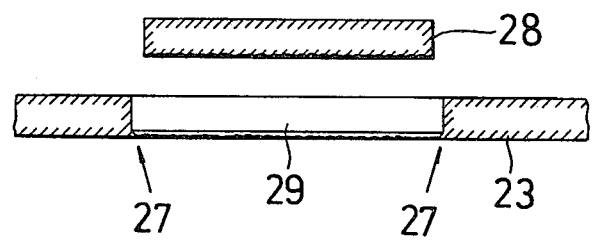
(b)
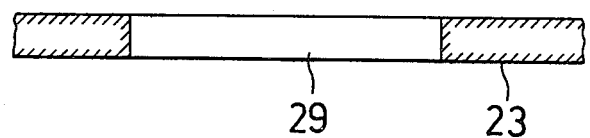
(c)
FIG. 6
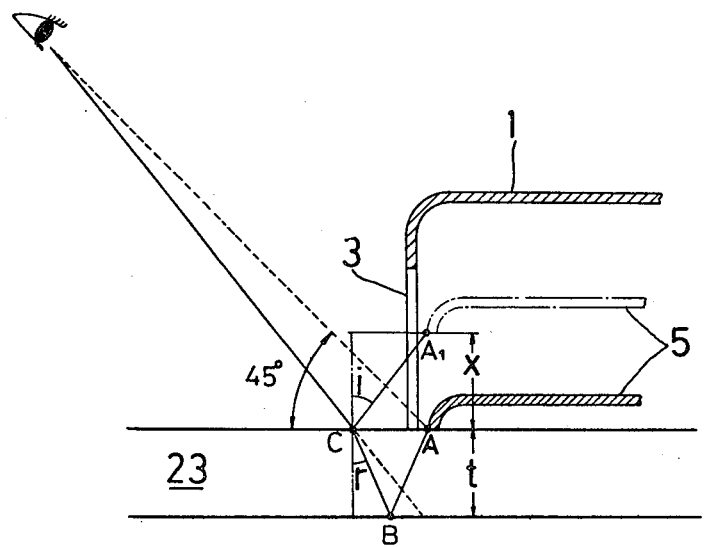

APPARATUS FOR FORMING HOLES IN PLATE GLASS

This is a division of application Ser. No. 919,407, filed June 26, 1978 now U.S. Pat. No. 4,209,272 dated June 29, 1980.

A large hole is conventionally made in plate glass by making a cut, using a glass cutter, in the surface of plate glass along the outline of the hole to be made, then forming a number of small holes to perforate the plate along and within the cut, then breaking away portions of the perforated section from the center to the outer portions to gradually expand the broken section until all the perforated section is broken away, and finally grinding or polishing the peripheral edge of the broken section to complete the hole in the plate. Such a conventional method may cause cracks outside the hole and break the whole plate, thus requiring great skill while the efficiency of work is low. In addition, this method is applicable only for relatively large holes, not for small holes.

In place of the above method, attempts have been made to make holes using a core drill. However, as the core drill cuts into the plate glass to a depth just before the drill penetrates the plate, the very thin portion which has not yet been sawed through will be subjected to very high stresses from the drill, and a sudden load may cause cracks in the plate or a large broken or cut-away portion in the final hole, which will make the finishing of the hole difficult.

Further, glass is extremely hard and is normally cut only by a diamond. However, since diamonds cannot withstand high temperatures, the diamond teeth used in a core drill may be burned out by friction heat generated between the teeth and glass during rotation of the core drill. Thus, forming holes in glass plates using core drills have required solutions for the problem of friction heat and also developments for safe and accurate methods of cutting.

In view of the above points, it is a principle object of this invention to provide improved apparatus for making holes of various diameters with well formed edges, without cracks, safely and simply using a core drill and without requiring a great deal of skill. It is another principle object to provide an improved method of forming such a hole.

Preferred embodiments of the invention will be described hereinafter referring to the accompanying drawings, wherein:

FIG. 1 is a side view partially in section of a core drill according to a first embodiment of the invention;

FIG. 2 is a side view of an inner sleeve used in the core drill;

FIG. 5 is a sectional view illustrating the process for making a hole in plate glass, according to this invention; and FIG. 6 is a schematic view illustrating optical refraction for measuring the thickness of plate glass according to this invention.

Figure 3:
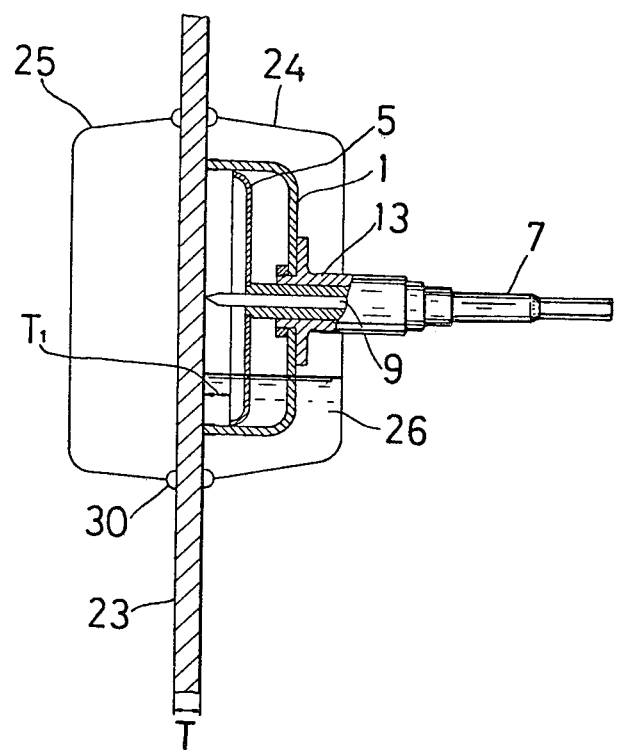
FIG. 3 is a side view partially in section showing the drill during operation.

The construction of a core drill or hole saw according to this invention will be explained by reference to the first embodiment shown in FIG. 1.

A circular cup-shaped blade 1 has at its forward edge, a plurality of spaced cutting or grinding teeth 2 formed of hard agglomerated diamond powder or particles, which are embedded, preferably at regular intervals, along the circular edge of the blade. While they are not always necessary, the peripheral or axial wall of blade 1 may be formed with one or, preferably, a plurality of axial slots 3. The slots preferably extend to the forward edge and are spaced at regular intervals. The slots 3 serve to discharge cutting or sawing powder or particles away from the forward cutting edge of the blade during a hole-making operation. As will be described in detail hereinafter, the slots 3 also permit the thickness of plate glass to be measured. In this regard, the length of the slots 3 must be greater than the thickness of the plate glass in which a hole is being made.

An axial stopper plate 5 having a diameter slightly smaller than the inner diameter of the axial wall of the blade 1, is secured as for example, by a centrally located threaded hole 6 which is threaded to the threaded forward end of a driving spindle 7. The spindle 7 is connected, during operation, to a drive motor (not shown), which may for example be an electric or pneumatic motor.

The spindle 7 is formed with a bore 8 therethrough, which opens at the forward end of the spindle. A center pin 9 having a super-hard tip is slidably mounted within the bore 8 and it is biased forwardly by a compression spring 10. The pin 9 is formed with a key groove 11 for engagement with a radial key 12 that projects inwardly from the spindle, so that center pin 9 will rotate together with the spindle. The locations of the key 12 and both ends of the key groove 11 are determined so that the tip of center pin 9 normally projects forwardly of the tips of the teeth 2 due to the action of spring 10 when the drill is not used, and the center pin 9 can rectract against the spring force until its tip moves to the plane of the forward cutting end or edge of stopper plate 5 as the drilling proceeds.

An inner sleeve 13 is slidably mounted on spindle 7 and, as best shown in FIG. 2, it has a rear portion that is axially divided to form a chuck part 14 and a middle portion with an external thread 15. The forward portion 16 of sleeve 13, which extends forwardly from a flange 17, is externally threaded and inserted into a central hole 4 formed in the blade 1 with the flange 17 abutting the back face of blade 1. A nut 18 is then threaded on the threaded portion 16 to secure the sleeve 13 to blade 1. The chuck part 14 of the sleeve 13 has an outside taper at the rear ends 19.

An outer sleeve 20 has a forwardly located internal thread and a rearward, internal taper 21, and it is screwed on the thread 15 of the inner sleeve 13. A nut 22 is threaded on the rear portion of the spindle 7 and it has a forward step for engagement with the rear end of the outer sleeve 20 to prevent the outer sleeve from moving rearwardly.

Figure 4:
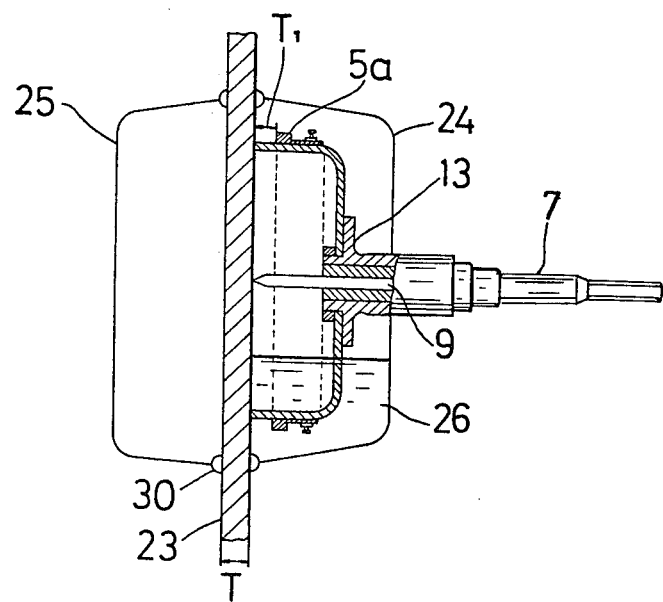
FIG. 4 is a view similar to FIG. 3 but showing a second embodiment during operation.

The core drill of the second embodiment as shown in FIG. 4 differs in construction from that of the first embodiment in FIGS. 1 and 3 only in that the second embodiment has, in place of the latter's stopper plate 5, a stopper ring or band 5a which is slidably mounted on the outside of the axial wall of blade 1 and may be fixed in position with screws.

The parts of the core drill are preset as follows:

As shown in FIG. 5a, a predetermined depth or distance $T_1$ of sawing, between the tip of teeth 2 and the forward end of the stopper plate 5 (FIG. 3) or 5a (FIG.

4), is set to be equal to the plate glass thickness T minus approximately 0.5 to 1.0 millimeter or, in equation, $T_1 = T - 0.5-1.0$ mm. In the embodiment of FIG. 4, this is done merely by securing the stopper ring 5a at the desired position with the screws.

In the embodiment of FIGS. 1 and 3, the setting is accomplished as follows. First of all, the nut 22 and the outer sleeve 20 are turned to move rearwardly so that the tapered portions 19 and 21 of the sleeves 13 and 20 disengage from each other. The spindle 7 and the inner sleeve 13 are moved relative to each other and located so that the distance between the tip of the teeth 2 and the forward end of the stopper plate 5 will be $T_1$ as specified above. The outer sleeve 20 is then turned to move forward so that the tapered portions 19 and 21 of the sleeves will engage each other. This is continued until the tapered portions 19 of the inner sleeve are compressed radially inwardly on to the chuck spindle 7. As a result, the stopper plate 5 is fixed in the preset position relative to the blade 1 while the blade 1 secured to inner sleeve 13 becomes rotatable together with spindle 7. Finally, nut 22 is turned to move forwardly and engage the rear end of outer sleeve 20, and thereby maintain a tight and secure assembly of the parts.

The operation is as follows:

The center pin 9 is located at the center of a hole to be made in the plate glass 23, so as to avoid eccentricity of the drill.

As shown in FIGS. 3 and 4, both sides of the plate glass 23 are hermetically enclosed by a pair of bowl-shaped protectors 24 and 25 which encircle the hole being made. Protectors 24 and 25 are sealed to the plate glass by, for example, conventional suction means 30. The protector 24 enclosing the blade 1 may be formed at an upper portion with a covered opening for filling it with a proper amount of water 26 in order to submerse the lower side of the blade, so that the teeth 2 will be cooled by being exposed to or passing through the water. This prevents the diamond teeth, which cannot tolerate high temperatures, from being overheated due to friction on the glass. Protector 24 may also be formed at its bottom with means for removing the water.

In operation, the drive motor is energized and the drill 1 is driven and pushed against the glass 23. The center pin 9 normally protrudes from the forward edge of the drill 1, but it retracts relative to the core drill against the spring 10 force, as shown in FIGS. 3 and 4, when the teeth 2 begin to cut the glass plate. As the cutting or sawing proceeds and the tips of the teeth 2 reaches the predetermined depth $T_1$ (FIG. 5a), the stopper 5 or 5a has moved into contact with the glass surface and prevents any further sawing. After the drilling is stopped and the drill 1 is retracted, a peripheral inner portion radially adjacent the sawed circle of the plate glass, is softly struck in the direction of arrows 27, FIG. 5(b), to break off the thin portion that has not been sawed, so that a glass disc 28 will separate from the glass plate 23, thereby forming a hole 29. The peripheral side of the hole 29 is left with sharp and rough broken edges which should be ground or polished by a grinding stone to produce a finished smooth surface, FIG. 5(c).

In summary, the sawing is stopped shortly (preferably 0.5-1.0 mm) before the plate glass is completely pierced, by means of the stopper 5 or 5a which contacts the glass surface. This eliminates cracks or fissures in the glass and rough cuts or broken portions around the hole as is the case when using a conventional core drill that almost pierces the glass. As a result, hole sawing in plate glass is accomplished more accurately, safely, simply and more efficiently than is the case with the conventional hole-making process, done manually by a glass cutter using great skill. This also permits easy and accurate hole-making in glass plates containing reinforcements, which have made hole-making especially difficult.

The thickness of 0.5-1.0 mm mentioned above which should remain after sawing, is an advantageous experimental value which allows the glass disc 28 to be separated from the plate 23, FIG. 5(b) without causing cracks in the plate 23 and permits the grinding or finishing of the sawed hole to be made easily.

FIG. 6 illustrates a method of obtaining an approximation of the plate glass thickness, using the core drill of the first embodiment shown in FIG. 1. First, the nut 22 and the outer sleeve 20 are turned to move back so that the chuck of the inner sleeve 13 is released. The tips of the teeth 2 and the forward end or edge of the stopper plate 5 are both moved into contact with the glass surface. When one observes at the angle of 45° to the surface of glass plate 23 outwardly of blade 1 around a given point A on the periphery of stopper 5 through axial slot 3 of blade 1 with his eyes more than about 30 centimeters from point A, the point A is reflected at a point B on the back side or surface of plate 23 and appears as a lighter or paler image at a point C on the upper side of plate 23. After the upper side of plate 23 is marked at point C, stopper 5 is moved backwardly (upwardly in FIG. 6) until the darker image of the given point A, now moved to $A_1$, on the upper side of plate 23 aligns or coincides with point C, whereby the distance X between the forward end of stopper 5 and the tip of teeth 2 will be about 1.07 times as large as the thickness t of plate 23. This figure is calculated as follows. When the refractive index of glass relative to air is 1.5, Snell's law of refraction will give the equation $$\frac{\sin i}{\sin r} = 1.5. \tag{1}$$

FIG. 6 allows the equation $$2t \cdot \tan r = x \tan i \tag{2}$$

$$x = 2\frac{\tan r}{\tan i} t = 2 \frac{\sin r}{\sin i} \cdot \frac{\cos i}{\cos r} t = \frac{2}{1.5} \cdot \frac{\cos i}{\cos r} t \tag{3}$$

If the distance between the eyes and the point A (FIG. 6) is lengthened, angle i approaches 45°. Then, $$\cos i \approx \cos 45° = \sqrt{\frac{2}{2}} \tag{4}$$

Accordingly, from equation (3), $$x \approx \frac{2}{1.5} \cdot \frac{\sqrt{2} \, t}{2 \cos r} = \frac{\sqrt{2} \, t}{1.5 \cos r} \tag{5}$$

From equation (1), $$1.5 = \frac{\sin i}{\sin r} \approx \frac{\sin 45°}{\sin r} \approx \frac{0.707}{\sin r} \tag{6}$$

$$r \approx 28° \, 10' \tag{7}$$

By inserting this into equation (5), $$x \approx \frac{\sqrt{2}\, t}{1.5 \cos 28° 10'} \approx 1.07\, t \tag{8}$$

Thus, if the thickness t of the plate glass is 1 cm, ×will be about 1.07 cm, or greater than t by about 0.7 mm.

When a hole is formed in the glass plate after the glass thickness has been measured by this method, if the thickness t is on the order of, for example, 1 cm, it is necessary to fix stopper plate 5 at a position about 1.7 mm forwardly of the point $A_1$ in order to locate stopper plate 5 for a predetermined depth $T_1 = t - 1$ mm, FIG. 3 or 5a, as $$T_1 = t - 1 \text{ mm} \approx \times -0.7 \text{ mm} - 1 \text{ mm} = \times -1.7 \text{ mm} \tag{9}$$

In the equations, the symbol $\approx$ means to approximately equal.

What is claimed is:

1. A core drill for plate glass, comprising:
    a driving spindle,
    a slide member slidably surrounding said spindle and having an outer thread and a chuck part, a sleeve having an inner thread for engagement with said outer thread and adapted to compress said chuck part against said spindle so that said slide member is fixed to said spindle,
    a cup-shaped blade fixed to said slide member and having cutting teeth at its forward end, said blade having an axial wall formed with at least one axial, forwardly open slot,
    stopper means secured to said forward end of said spindle within said blade for preventing said blade from cutting beyond a predetermined depth,
    said chuck part including an axially divided portion having and outer taper, and said sleeve having an inner taper for engagement with said outer taper, such that when said sleeve is turned relative to said slide member, said chuck part will be fixed to or released from said spindle.

* * * * *